United States Patent Office 3,482,913
Patented Dec. 9, 1969

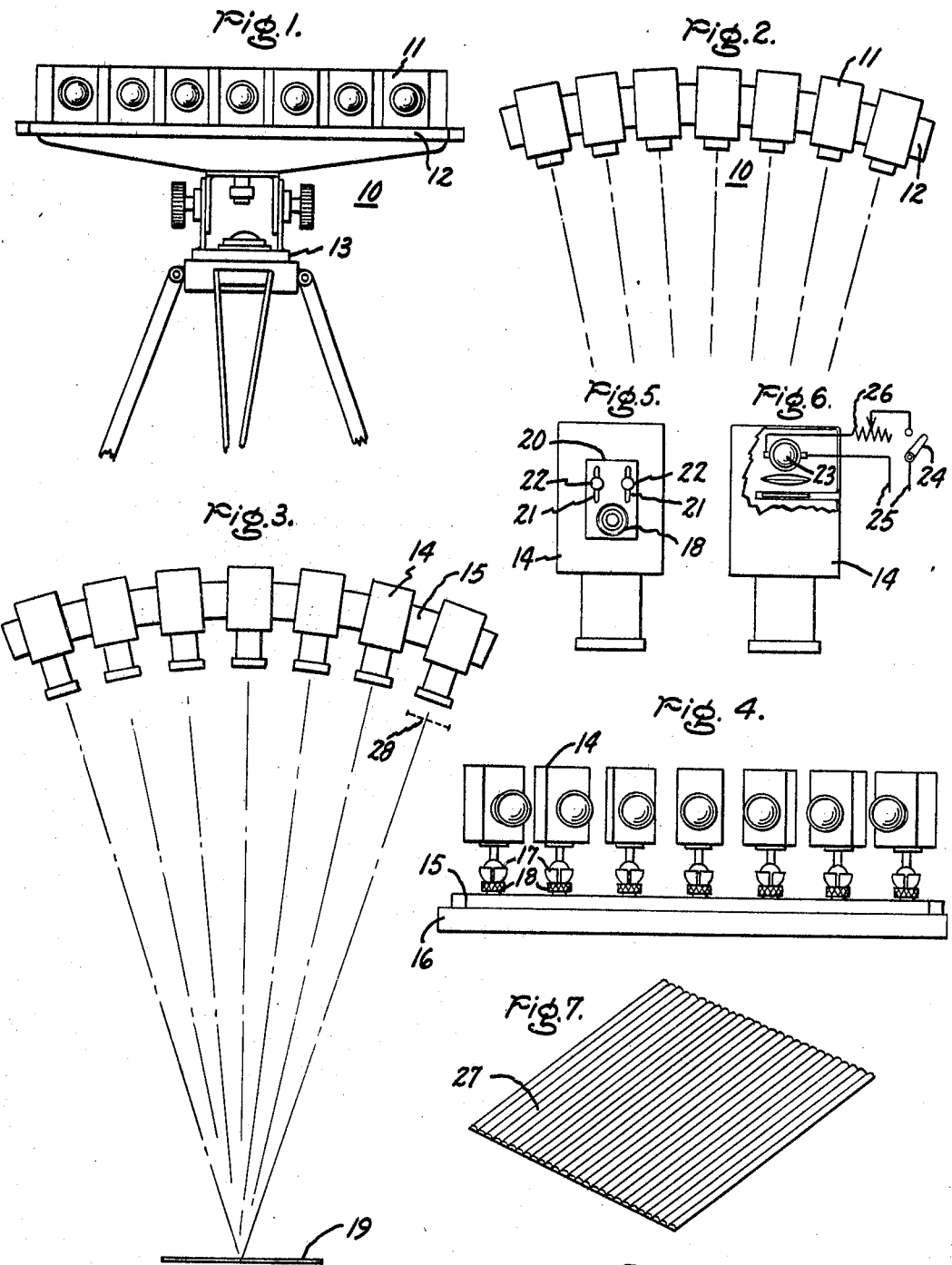

1

3,482,913
METHOD AND APPARATUS FOR COMPOSING AND ENLARGING THREE DIMENSIONAL PICTURES
William E. Glenn, Jr., Scotia, N.Y., assignor to General Electric Company, a corporation of New York
Continuation-in-part of application Ser. No. 495,276, Oct. 12, 1965. This application Apr. 18, 1967, Ser. No. 631,772
Int. Cl. G03b 27/32, 27/52, 21/00
U.S. Cl. 355—33                              4 Claims

ABSTRACT OF THE DISCLOSURE

Three dimensional pictures of the type consisting of a plurality of groups of picture elements with the elements of each group taken from different vantage points and with the groups of picture elements adapted to be viewed through a lenticular lens are composed and enlarged in apparatus including a number of projectors equal to the number of vantage points from which the scene is photographed. Each projector is made independently adjustable in position so that the projected picture from each projector occupies the same area on a screen, i.e. the magnification is the same, and the objects in the plane which it is desired to have in sharp focus are exactly registered by adjustment of the projectors. In addition, the level of illumination provided by the projection lamp of each projector is independently adjustable to adjust the brightness of the picture elements contributed by the scene as photographed at each location. In a color picture, color balance is produced by means of filters in the individual projection paths to compensate for any lack of fidelity in the color of the scene as recorded. Each projector may be turned on and off independently so that registration and adjustment may take place by comparing the projected scene from each projector with that of one other projector. After the initial adjustment of the projectors, all projectors are turned on and a lenticular viewing screen is placed over the image area and the scene viewed as a three dimensional picture. Further adjustments can be made if such are indicated from the appearance of the final picture.

---

The present application is a continuation-in-part of my application Ser. No. 495,276, filed Oct. 12, 1965.

There is an increasing interest in making good quality three dimensional color pictures, and some pictures of this type have recently appeared in national magazines. One method of taking three dimensional pictures and reproducing them is described in an article by Leslie P. Dudley entitled "Autostereoscopic Lunar Photography," appearing in the October 1961 Journal of the Society of Motion Picture and Television Engineers, 70, pages 799–803. As there described, particularly on page 800 under the heading "The Panoramic Parallax Stereogram," a black and white picture is taken by a number of cameras in closely spaced, side-by-side relation so that a number of images of the same scene are photographically recorded from a plurality of spaced vantage points, the number corresponding to the number of picture elements in each group of lenticular pictures to be produced. A set of picture elements is made up of the interdigitated picture elements, one element from the image as recorded by each of the cameras, so that each set of picture elements appearing under one lenticule of the viewing lenticular screen represents an elemental portion of the total scene as viewed by each one of the cameras, and adjacent pairs of these picture elements in a single set form a stereoscopic pair. Whether or not the stereoscopic pairs of elements are adjacent or spaced by two or more picture elements depends upon the spacing of the camera and the distance to the scene as compared to the interocular distance and the viewing distance, i.e. the camera angles and the viewing angles.

The multiple camera arrangement described above gives independent photographic images of a particular scene taken from different vantage points. Since the three dimensional aspect results from the defocus or lack of exact registry of the edges of objects in all planes except the one of sharp focus, it is possible to determine the plane of sharp focus when composing the picture by making provision for registering the objects in the desired plane. Also, the quality of the composite three dimensional picture can be enhanced by independently adjusting the intensity of the light projected to each recorded image and also, in the case of color pictures, correcting for any color variation between the pictures as taken by adjacent cameras. The present invention involves a method and apparatus for composing three dimensional pictures which provides this flexibility in picture composition and resultant improved quality.

It is accordingly an important object of the present invention to provide an improved method and apparatus for composing three dimensional pictures.

It is a further object of my invention to provide a method and apparatus for determining the plane of sharp focus of the three dimensional picture at the time of composing the picture, rather than at the time of photographing the scene.

Further objects and advantages will become more apparent as the following description proceeds, reference being had to the accompanying drawings, and its scope will be pointed out in the claims.

In the drawing:

FIG. 1 is an elevational view in outline illustrating a camera arrangement suitable for taking three dimensional pictures;

FIG. 2 is a plan view in outline of the camera arrangement of FIG. 1;

FIG. 3 is a schematic representation of a projection and enlarging system suitable for composing and enlarging the images photographed and recorded by the camera of FIG. 1;

FIG. 4 is an elevational view of the projector assembly of FIG. 3;

FIG. 5 is a bottom view of one of the projectors shown in FIG. 4, showing the details of the mounting arrangement;

FIG. 6 is a top view of one of the projectors of FIG. 4 with a portion of the casing broken away; and FIG. 7 is an isometric view illustrating a lenticular screen of the type used for viewing the composite three dimensional picture.

A suitable camera arrangement for taking pictures to be reproduced in accordance with the present invention is shown in FIGS. 1 and 2 of the drawing. Camera assembly 10 is made up of a number of individual cameras, shown in outline at 11, all mounted on a support 12 in the same horizontal plane and preferably on the arc of a circle, as shown in FIG. 2. The assembly is preferably mounted on an adjustable support such as tripod 13. The cameras are compact and are particularly so in a horizontal direction so that several cameras occupy a horizontal distance related to the spacing between the eyes of an individual who is to view the image. The actual distance, compared to the interocular distance, will depend upon the relationship between the picture taking distance and the viewing distance, for example. The number of cameras which corresponds to the number of picture elements that will appear under each lenticule may be in the order of seven to ten, for example, seven having been illustrated in FIG. 1. In taking the picture, the film, which may be either black and white or color, is exposed in each camera so that there are seven pictures taken from the seven vantage points corresponding to the locations of the individual cameras. An improved camera of the above general type is described and claimed in my copending application Ser. No. 620,844, filed Mar. 6, 1967, as a continuation-in-part of my application Ser. No. 495,276, filed Oct. 12, 1965.

Assuming that a scene has been photographed on black and white film from the seven vantage points by the camera apparatus of FIGS. 1 and 2, and seven positive transparencies of the recorded scene prepared, these transparencies, which may be prepared in the form of conventional slides, are each positioned in the corresponding projectors 14 of FIG. 3. The projectors are mounted on a common supporting bar 15, which may be secured to a suitable support such as a table top illustrated at 16. Each of the projectors 14 is mounted in a manner to allow the projected picture to be moved either horizontally or vertically, and is made adjustable toward and away from the image area to determine the amount of magnification produced, so that the pictures may be registered in a manner described in more detail hereinafter. Movement of the projector to move the projected scene vertically and horizontally is provided by an arrangement shown schematically as a simple ball and socket joint 17, which may be locked by a suitable thumb nut 18 to fix the projector in position once the adjustment has been made. Since it is also desirable to be able to control the magnification, the projector is made movable toward and away from the image area shown as screen 19. This is accomplished, as shown in detail in FIG. 5, by mounting the support for the ball portion of the universal joint which is carried by the camera on a plate 20 provided with slots 21 elongated in the direction of the length of the projector. Studs secured in fixed relation to the projector casing extend through the slots and are provided with thumb nuts 22 which may be tightened to secure the projector in position once the desired position has been obtained.

Also, as shown in FIG. 6, the projection lamp 23 of each of the individual projectors may be turned off and on independently by a switch 24 connecting the supply lines 25 with the porjection lamp through an adjustable resistance 26, so that the level of illumination and the intensity of the projected image may be controlled at will.

The manner in which the above enlarging and composing apparatus is employed in accordance with the method of the present invention will now be described with reference to the composing and enlarging of a black and white three dimensional picture. As previously indicated, a slide prepared from the image as recorded by each of the cameras is placed in each of the projectors of FIG. 3. The projection lamp for one of the projectors, assume the centrally located projector, is turned on, the level of illumination suitably adjusted by adjusting the variable resistor, and the position of the projector adjusted so that the projected scene is of the desired size and location on the image area or screen 19. Next a second projector, such as an adjacent one, is turned on and the position of the projector adjusted toward and away from the screen until the scene is the proper size, and then an object in the plane of desired sharp focus of the three dimensional picture, in other words, the plane which appears to be the plane of the picture, is exactly registered with the corresponding object as projected by the first picture. It is apparent that the independent adjustment of the projector position as well as of the light illumination involves repeated adjustment until the desired result is obtained. These steps are repeated for each of the projectors as compared to one, and preferably to the same projector, such as the centrally located one, and after this has been accomplished, all projectors are turned on and a lenticular viewing screen, such as shown at 27 in FIG. 7, is placed in front of the image area of the viewing screen. It is now possible for the composer to view the picture as it will appear in its finished form. The adjustments described above can be refined and the level of illumination changed as the viewer moves his position from side to side so that different pairs of the picture elements are actually viewed. For example, if the level of illumination appears to change as different pairs of picture elements are viewed as the observer moves his head from side to side, the level of illumination provided by appropriate ones of the projectors is adjusted by adjusting the corresponding rheostat 26. If the scene is a color scene, the color balance between the pictures taken by the various cameras can be improved by the insertion of suitable color filters in front of appropriate projectors, as illustrated by the color filter shown at 28 in FIG. 3.

From the foregoing, it is apparent that the present invention provides an improved method and apparatus for composing and enlarging a three dimensional composite picture, which may then be directly viewed. It is particularly useful as the composing and enlarging step of a method of preparing the picture information for printing three dimensional pictures. Accordingly, the method and apparatus of the present invention are particularly suited for the improved method of printing three dimensional pictures such as described and claimed in my copending application Ser. No. 631,770, filed concurrently herewith, relating to the production of halftone transparencies for the printing of three dimensional pictures.

Very briefly, the method of preparing transparencies for the printing of black and white three dimensional pictures can be accomplished by a single step utilizing essentially the apparatus of FIG. 3 after the composing and enlarging has been accomplished. The lenticular screen may be placed over the image area, the screen 19 replaced by a high contrast film available on the market under the trade name "Kodalith," and a suitable halftone screen ruled in a direction orthogonal to the lenticular lenses placed in slightly spaced relation in front of the lenticular plate. In this manner, a composite interdigitated halftone transparency is produced, and this transparency may be used to prepare the printing roll or plate in a manner well understood in the art. Actually, an improved method of preparing the composite halftone transparency is a multistep process as described in more detail and claimed in my above mentioned copending application Ser. No. 631,770, filed concurrently herewith. As there described, the first step is the preparation of enlarged continuous tone black and white transparencies corresponding to the scenes individually photographed by the spaced apart cameras. After the composite scene has been composed, as described in the foregoing specification, these enlargements are made without disturbing the adjustment of the projectors and their associated projection lamps. A film holder is substituted for the screen 19 of FIG. 3, and the holder is provided with suitable means, such as registering pins, for registering the film with respect to the holder. Accordingly, each black and white film exposed to the projected image which has previously been registered during the composing step is reproduced on the film in a way in which the registration can be exactly duplicated in successive steps.

It is apparent that the present invention makes possible great flexibility in the composing and enlarging of three dimensional pictures and with a resultant improved quality of the finished product. The plane of the picture may be controlled at the time of composing the picture rather than at the time of taking, as was the common practice with prior art approaches to three dimensional pictures.

What I claim as new and desire to secure by Letters Patent of the United States is:

1. The method of composing a three dimensional picture of the type comprising a plurality of groups of picture elements with the picture elements of each group being produced from photographically recorded images made from horizontally displaced vantage points and adapted to be viewed through overlying lenticular lens registered with each group of picture elements, said method comprising projecting the picture information recorded at each of a plurality of different vantage points from a corresponding one of an array of projectors, adjusting each of the projectors to register in all of the projected images objects in a selected plane to establish the plane of sharp focus of the picture when viewed through a lenticular plate independently of the plane of sharp focus as determined by the vantage points from which the photographically recorded images were made.

2. The method of claim 1 wherein the images produced by the individual projectors are recorded in succession on separate films each provided with position determining means so that the positional relationship of the recorded images can be reestablished in subsequent steps, and converting the individual transparencies to a composite interdigitated halftone transparency while maintaining the positional relationship established by the earlier composing step.

3. Apparatus for composing and enlarging a three dimensional picture of the type comprising a plurality of groups of picture elements with the picture elements of each group being produced from photographic recordings made from horizontally displaced vantage points, said apparatus comprising a plurality of projectors corresponding in number to the number of vantage points from which the photographic recordings are made, independently adjustable mounting means associated with each of said projectors providing effectively independent positioning of each projector with respect to the image area so that the magnification produced by each projector with respect to the image area and horizontal and vertical adjustment of the position of the images projected from each projector may be independently determined.

4. The apparatus of claim 3 in which means are provided for independently adjusting the level of illumination provided by each projector.

References Cited

UNITED STATES PATENTS

| | | | |
|---|---|---|---|
| 2,562,077 | 7/1951 | Winnek | 355—33 X |
| 3,225,651 | 12/1965 | Clay | 355—33 X |

NORTON ANSHER, Primary Examiner

R. A. WINTERCORN, Assistant Examiner

U.S. Cl. X.R.

352—43, 58, 61; 353—7; 355—40, 77